US009368037B1

(12) United States Patent
Elliott et al.

(10) Patent No.: US 9,368,037 B1
(45) Date of Patent: Jun. 14, 2016

(54) SYSTEM AND METHOD OF STATEFUL APPLICATION PROGRAMMING INTERFACE (API) TRAINING

(71) Applicant: Sprint Communications Company L.P., Overland Park, KS (US)

(72) Inventors: Steven L. Elliott, Olathe, KS (US); Christopher J. Ellis, Eudora, KS (US); Charles L. Micklavzina, Overland Park, KS (US); Todd W. Schuster, Stilwell, KS (US); Marshall A. Siegel, Gahanna, OH (US); Jamie J. Williams, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 331 days.

(21) Appl. No.: 13/802,417

(22) Filed: Mar. 13, 2013

(51) Int. Cl.
*G09B 5/00* (2006.01)
*G09B 7/02* (2006.01)
*G09B 7/00* (2006.01)

(52) U.S. Cl.
CPC .. *G09B 5/00* (2013.01); *G09B 7/00* (2013.01); *G09B 7/02* (2013.01)

(58) Field of Classification Search
USPC .......................................................... 434/219
See application file for complete search history.

(56) References Cited

U.S. PATENT DOCUMENTS

| 6,324,282 | B1 * | 11/2001 | McIllwaine et al. ...... 379/265.06 |
| 6,944,596 | B1 * | 9/2005 | Gray et al. ..................... 705/321 |
| 7,110,525 | B1 * | 9/2006 | Heller et al. ............. 379/265.11 |
| 7,174,010 | B2 * | 2/2007 | McIlwaine et al. ...... 379/265.01 |
| 7,505,557 | B2 * | 3/2009 | Modica et al. .................. 378/57 |
| 7,621,748 | B2 * | 11/2009 | Bajer et al. .................... 434/219 |
| 7,801,295 | B2 * | 9/2010 | Patel et al. ............... 379/265.12 |
| 8,094,790 | B2 * | 1/2012 | Conway et al. ............ 379/88.16 |
| 8,442,207 | B2 * | 5/2013 | Hegde et al. ............ 379/265.01 |
| 2003/0008266 | A1 * | 1/2003 | LoSasso et al. ............... 434/118 |
| 2003/0059760 | A1 * | 3/2003 | Tojek et al. .................... 434/322 |
| 2004/0063085 | A1 * | 4/2004 | Ivanir et al. .................... 434/322 |
| 2007/0166685 | A1 * | 7/2007 | Gilbert et al. ................. 434/323 |
| 2009/0125411 | A1 * | 5/2009 | Otto et al. ........................ 705/26 |
| 2011/0008758 | A1 * | 1/2011 | Kortas et al. .................. 434/219 |
| 2011/0229864 | A1 * | 9/2011 | Short et al. .................... 434/219 |
| 2014/0255895 | A1 * | 9/2014 | Shaffer et al. ................. 434/350 |

OTHER PUBLICATIONS

Tri-City Retail, "End-User Training Services", accessed at: http://web.archive.org/web/20120208175243/http://www.tricityretail.com/hqserv_enduser.htm (Feb. 8, 2012).*

* cited by examiner

*Primary Examiner* — Xuan Thai
*Assistant Examiner* — James Hull (57) ABSTRACT

A stateful application programming interface training system. The system comprises an interface configured for use in a customer facing production environment, wherein an instance of the interface is launched for each student using the training system; and a training application, wherein the application is configured to receive messages from the instances of the user interface, wherein each message invokes one of a plurality of different application programming interface methods, associate each message to one of a plurality of students, maintain a state of a plurality of training scenarios, a separate state of a training scenario for each of the plurality of students based on an identity of the student, determine when a state of a training scenario completes a checkpoint, and in response to a completed checkpoint, return particularized updated information to the instance of the interface associated with the completed checkpoint.

19 Claims, 6 Drawing Sheets

SYSTEM AND METHOD OF STATEFUL APPLICATION PROGRAMMING INTERFACE (API) TRAINING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Automated systems for providing service to customers, for example mobile phone retail store customers, may be complicated. A clerk may use a user interface provided by a computer to enter customer information and/or service selections as well as a model identity of the mobile phone. The process of completing a mobile phone purchase transaction and service activation can involve making several selections on each of a plurality of different user interface screens. In some cases, the selections must be made in the correct order or the process may fail or need to be repeated. Thus, users of complex automated systems desirably are trained in the use of the automated system.

SUMMARY

In an embodiment, a stateful application programming interface training system is disclosed. The system comprises a student user interface comprising a retail management system (RMS) configured for use in a telecommunication service provider customer facing production environment, wherein a separate instance of the student user interface is launched for each student using the training system. The system further comprises an application programming interface training application configured to execute on a computer system. The application programming interface application is configured to receive messages from the instances of the student user interface, wherein each message invokes one of a plurality of different application programming interface methods, associate each message to one of a plurality of students, maintain a state of a plurality of training scenarios, a separate state of a training scenario for each of the plurality of students based on an identity of the student, determine when a state of a training scenario completes a checkpoint, and, in response to a completed checkpoint, return particularized updated information to the instance of the student user interface associated with the completed checkpoint.

In an embodiment, a method of training students in use of a telecommunication service provider customer-facing application is disclosed. The method comprises receiving messages from a plurality of instances of a student user interface, wherein each message invokes one of a plurality of different application programming interface methods and associating each message to one of a plurality of students. The method further comprises maintaining a state of a plurality of training scenarios, a separate state of a training scenario for each of the plurality of students based on an identity of the student, determining when a state of a training scenario completes a checkpoint, and, in response to completion of a checkpoint, returning particularized updated information to the instance of the student user interface associated with the completed checkpoint.

In an embodiment, another method of training students in use of a telecommunication service provider customer-facing application is disclosed. The method comprises defining a plurality of training scenarios using a user interface of an automated training application, wherein each training scenario specifies a sequence of states of a provisioning task, wherein each training scenario specifies a plurality of checkpoints that are activated when a specified sub-sequence of states of the provisioning task are completed in the defined sequential order, and wherein each training scenario specifies a termination event for the provisioning task, wherein the provisioning task comprises provisioning a telecommunication service. The method further comprises receiving messages from a first instance of a student user interface, wherein each message invokes one of a plurality of different application programming interface methods and associating each message from the first instance of the student user interface to a first student and to a first training scenario, wherein the first training scenario is one of the plurality of training scenarios defined using the user interface of the automated training application. The method further comprises receiving messages from a second instance of the student user interface, wherein each message from the second instance of the student user interface invokes one of the plurality of different application programming interface methods and associating each message from the second instance of the student user interface to a second student and to a second training scenario, wherein the second training scenario is one of the plurality of training scenarios defined using the user interface of the automated training application, and wherein the second training scenario is different from the first training scenario. The method further comprises maintaining a state of the first training scenario based on the messages received from the first instance of the student user interface, maintaining a state of the second training scenario based on the messages received from the second instance of the student user interface, returning particularized updated information to the first instance of the student user interface based on completion of a checkpoint of the first training scenario; and returning particularized updated information to the second instance of the student user interface based on completion a checkpoint of the second training scenario.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a stateful training system. The training system may be used for training workers in the use of complicated automated tools, for example training in the use of a retail management system (RMS) used to provision and activate wireless communication service for mobile phone users. While this disclosure discusses at length the example of a system for training service personnel in using the retail management system for provisioning and activating wireless communication service, it is understood that the principles of operation of the stateful training system are contemplated to be applicable and useful to provide training in the use of a wide variety of automated tools and/or applications which may be different in some ways from a retail management system.

The training system employs a production grade retail management system to provide students or trainees with a user interface and to interoperate with the remainder of the training system. The term production grade means that the subject retail management system is substantially identical to the retail management system that is used in "real world" practice, in an actual retail store for example. The retail management system associated with the training system may be isolated from the actual service provider network. The retail management system associated with the training system may be stood up on a smaller server computer (smaller relative to the retail management system that is in fact used in "real world" practice) and may not be deployed with geographical diversity or with an instantaneous fail-over back-up system. This design choice of using a production grade retail management system as the front-end for the trainee has the advantage that the trainee then uses the same system that he or she will use later when working in a customer-facing role, for example as a clerk in a mobile phone retail store. As used herein, the term customer-facing means an employee role in an enterprise that involves direct interaction with customers of the enterprise, either in face-to-face engagement or in a telephone call. At the same time, this choice presents the challenge that the remainder of the training system employs the complicated and rich application programming interfaces of the subject retail management system.

Additionally, it is desirable that as the trainee progresses through a service activation scenario that the production grade user interface presented by the retail management system provides realistic feedback. Realistic feedback entails that as the student or trainee executes a sequence of actions, for example a sequence of different application programming interface methods provided by the user interface, feedback presented to the student or trainee changes. For example, if the training scenario is adding a second line or mobile phone to a wireless service account, at the completion of some steps of the provisioning operation the feedback should show two separate lines and/or two separate phone numbers associated with the simulated subscriber account. This ability to present different feedback as a trainee progresses through a training scenario relies upon the statefulness of the training system, e.g., the function of the training system to respond to similar or identical application programming interface (API) method calls by returning different feedback to the user interface based on the state of the training system when the subject API method call is invoked by the retail management system.

The training system is configured to support a plurality of concurrent training sessions. The different trainees may be training on the same scenario, possibly at different rates. For example, a first trainee may have executed 10 steps of the scenario and a second trainee may have executed 13 steps of the same scenario. Alternatively, the first trainee may be training a first scenario while the second trainee is training a second, different scenario. The trainee logs into the system and is tracked based on his or her user id and selected or assigned training scenario. The training system permits an instructor to monitor the progress of any of the trainees using the system.

A training class may be composed from one or more training scenarios. A training scenario may be composed of one or more checkpoints and a terminus. A checkpoint may be composed of one or more states or API calls. Thus, a training scenario comprises a sequence of states and/or API calls. A trainee executes a training scenario by executing API calls one at a time and in the sequence designated by the training scenario. As the trainee executes API calls, the system keeps track of the state of the trainee, for example the point in the training scenario to which the trainee has progressed. If the trainee completes all of the API calls considered to compose a checkpoint in the right sequence, the checkpoint is completed. On completion of a checkpoint, updated feedback is provided back to the trainee via the user interface of the retail management system. This updated feedback may also be referred to as stateful feedback. If the trainee executes an API call out of order, given the state of the trainee's progress through the subject scenario, the system may provide a message indicating the trainee is off the canonical API invocation sequence and urge him or her to follow the appropriate sequence. The system provides a builder for the instructor to create and/or build classes and scenarios.

In an embodiment, the retail management system sends API calls to a messaging layer, as it does in a production environment, and a stateful training application retrieves the API calls to track and monitor the state of the trainee's training scenario. In some contexts the stateful training application may be referred to as an application programming interface (API) training application. When the trainee's training scenario reaches or completes a checkpoint, the stateful training application returns stateful feedback to the retail management system in a message placed in the messaging layer directed to the retail management system. In an embodiment, the stateful training application interworks with a backend simulator to obtain appropriate stateful feedback to return upon completion of scenario checkpoints.

Figure 1:
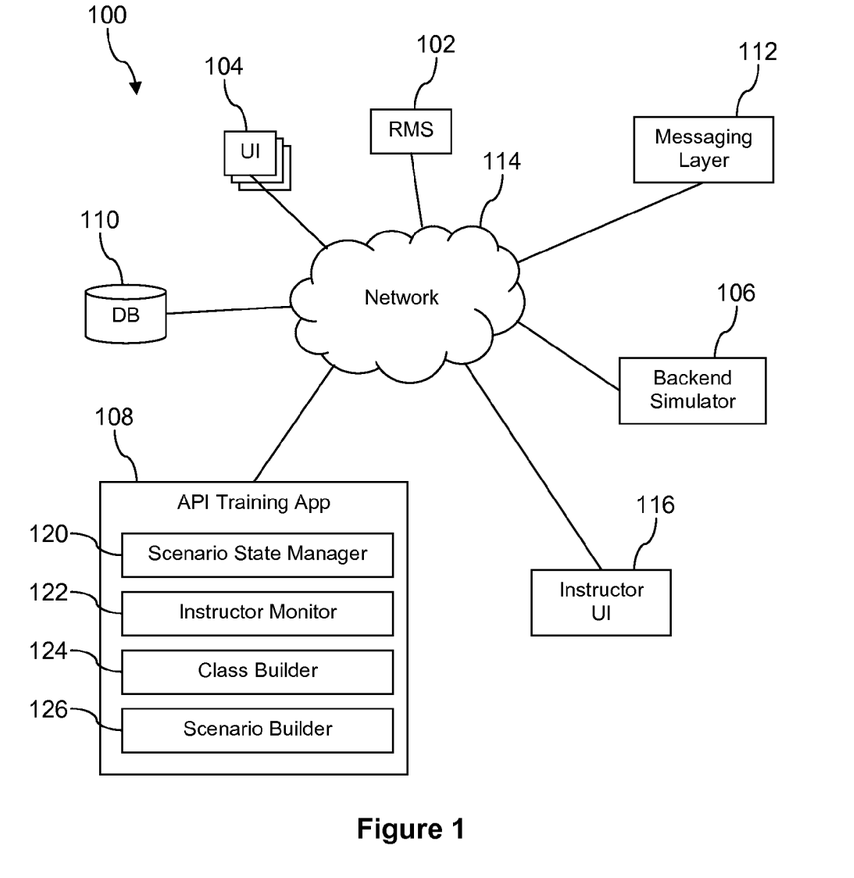
FIG. 1 is an illustration of a training system according to an embodiment of the disclosure.

Turning now to FIG. 1, a stateful training system 100 is described. In an embodiment, the system 100 comprises a retail management system (RMS) 102, one or more user interfaces 104 presented by the RMS 102, a backend simulator 106, an application programming interface training application 108, a data store 110, and an instructor user interface 112. In some contexts herein the application programming interface training application 108 may be referred to as the API training application 108 or as the application 108 for the sake of brevity. In an embodiment, the system 100 may be used to train students or trainees in the use of a telecommunications service provider provisioning system. For example, the system 100 may be used to instruct trainees in the use of a retail management system to provision subscriber accounts, for example to activate a service, to add a line to a service, to upgrade a service, to add a feature to a service, and the like.

A network 114 provides communication links among the RMS 102, the UIs 104, the backend simulator 106, the API training application 108, the data store 110, and the instructor user interface 116. The network 114 may comprise one or more public networks, one or more private networks, or a combination thereof. In an embodiment, the system 100 may comprise a messaging layer 112 that provides communication links between the RMS 102 and the API training application 108. The system 100 further comprises an instructor user interface 116. It is understood that the RMS 102, UIs 104, backend simulator 106, the API training application 108, the data store 110, the instructor user interface 116, and the messaging layer 112 execute on one or more computer systems. Computer systems are described in more detail hereinafter.

In an embodiment, the API training application 108 comprises a scenario state manager 120, an instructor monitor 122, a class builder 124, and a scenario builder 126. It is understood that one or more of the components 120, 122, 124, 126 may be combined into a single component. Additionally, a component described with reference to FIG. 1 as being a single component may comprise two or more separate components.

Figure 2:
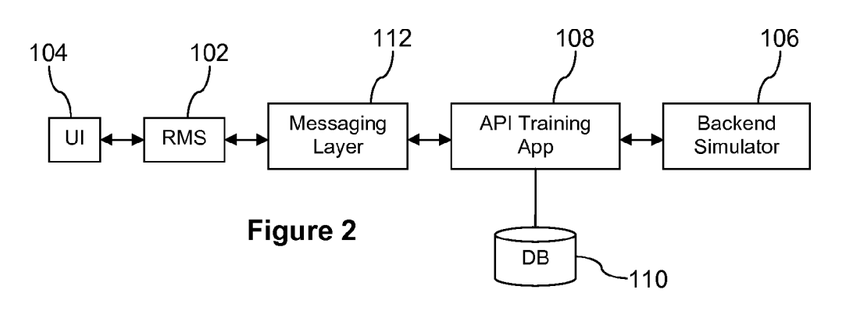
FIG. 2 is another illustration of a training system according to an embodiment of the disclosure.

Turning now to FIG. 2, an alternative depiction of the system 100 is described. When the system 100 is used for training, a student or trainee may be logged into the system 100 at the UI 104. The UI 104 presents a view provided by the retail management system 102, for example a web page or other user interface window. As the student interacts with the UI 104, the retail management system 102 invokes application programming interface methods, for example API methods provided by a backend provisioning system used in a production environment to activate wireless communication services and/or mobile communication devices. It may be that a plurality of API methods are invoked by a single control input entered by a trainee, for example clicking a SUBMIT button or the like, whereupon information from multiple fields in a window of the UI 104 may each be transmitted pursuant to independent API methods. In an embodiment, as many as 50 or more API methods may be invoked by a single web page or other user interface window. The retail management system 102 sends the API method invocation or method call as a message to the messaging layer 112. In an embodiment, the message that the retail management system 102 sends to the messaging layer 112 may contain one or a plurality of API method invocations. The message may identify the one or more API method invocations as well as an identity of the student or trainee. For example, the messages may contain a student identifier or a trainee identifier.

The API training application 108 retrieves messages from the messaging layer 112, for example the API method invocation message sent to the messaging layer 112 by the retail management system 102. The application 108, for example the scenario state manager 120 component of the application 108, analyzes a message to determine which UI 104 and/or which trainee generated the subject API method invocation. The scenario state manager 120 acts on the message appropriately, for example determining a state of a training scenario of the trainee, requesting stateful feedback from the backend simulator 106 based on the state of the training scenario, and returning the stateful feedback in a message to the messaging layer 112.

In an embodiment, the state manager 120 may comprise one or more stubs which may be referred to in some contexts as stateful stubs. A stub may be a software component, a software routine, a script, or some other logic executable on a computer system that provides a scaled down functionality by comparison to a production software component that the stub may at least partially simulate.

The retail management system 102 may retrieve the stateful feedback message from the messaging layer 112 and send to the UI 104. The UI 104 presents the stateful feedback to the trainee, for example a view of a wireless subscription account listing two separate lines in the place of the previous view that showed the same wireless subscription account listing only a single line.

Figure 3:
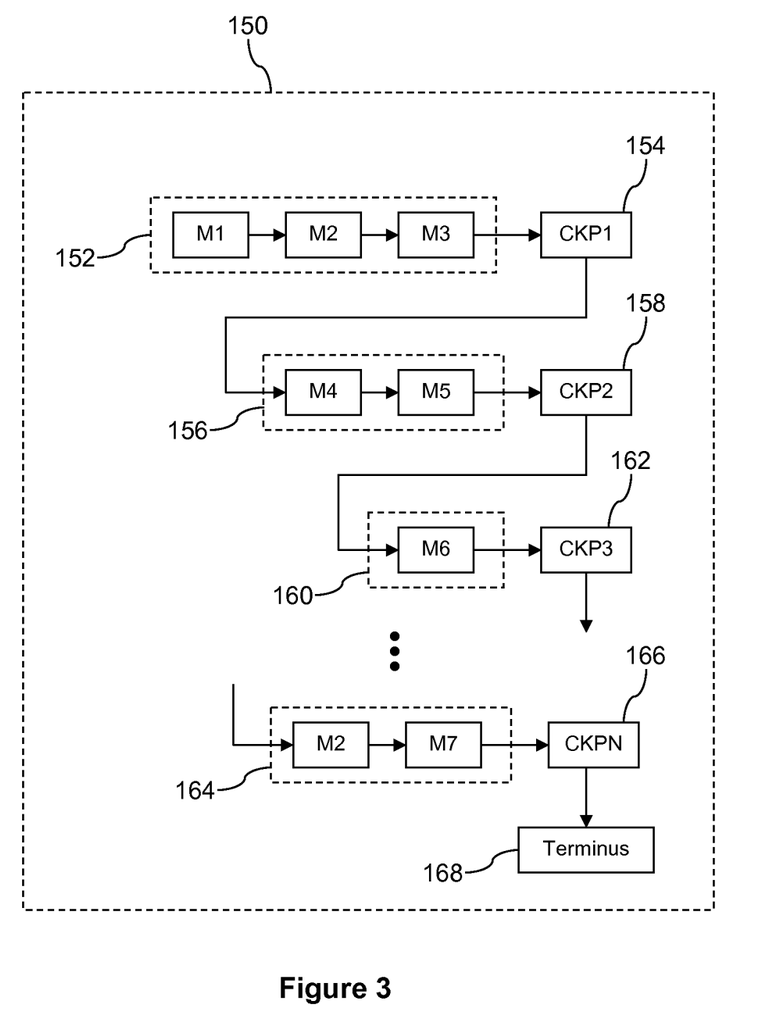
FIG. 3 is an illustration of a training scenario according to an embodiment of the disclosure.

Turning now to FIG. 3, an exemplary scenario 150 is illustrated. A scenario may be composed of any number of states, any number of checkpoints, and typically a single terminus. The exemplary scenario 150 comprises states M1, M2, and M3 that, when completed in the illustrated order, culminate in the activation of a first checkpoint 154. The states M1, M2, and M3 that culminate in the first checkpoint 154 may be referred to as a first sub-scenario 152. The scenario 150 further comprises states M4 and M5 that may be referred to as a second sub-scenario 156 and that culminate in a second checkpoint 158. The scenario 150 further comprises state M6 that may be referred to as a third sub-scenario 160 and that culminates in a third checkpoint 162. The scenario 150 further comprises states M2 and M7 that may be referred to as a fourth sub-scenario 164 and that culminates in a terminus 168.

A sub-scenario may be composed of any number of states, from one state to many states. A state may be repeated in different sub-scenarios. Alternatively, in an embodiment, a state may correspond to a unique step in the scenario and may not be repeated either in another sub-scenario or at a different point in the sequence of a single sub-scenario.

Each of the states may be associated with completing a specific API method invocation. Said in another way, a state is entered based on the invocation of an API method. Thus, the scenario 150 may enter the state M1 by invoking a first API method and enter the state M2 by invoking a second API method. In an embodiment, a state may be reentered at a later point in the scenario 150, for example by invoking the subject method again. For example, in the fourth sub-scenario 164, the state M2 may be reentered by invoking the second API method. It is understood that an indefinite number of states and checkpoints may be completed between the third checkpoint and the terminus 168. In another embodiment, however, entering the invoking an API method, for example the second API method, at a later point in the scenario 150 would result in entering a different state. A checkpoint may be viewed as an scenario entity that represents the completion of an abstract operation, where the abstract operation may be composed of the API method invocations that compose the sub-scenario culminating in the subject checkpoint.

The trainee training in a given scenario is expected to progress through the scenario in a specific sequence of states. For example, in the exemplary scenario 150, the trainee would be expected to reach state M1; after reaching state M1, the trainee would be expected to progress to state M2; after reaching state M2, the trainee would be expected to progress to state M3. If the student follows that canonical sequence of states, the first sub-sequence 152 culminates in the first checkpoint 154. If the student skips or misses a state or progresses to a state out of order, however, the first sub-sequence 152 does not culminate in activation of the first checkpoint 154. For example, in the exemplary scenario 150, if the trainee progresses to the M1 state, then to the M3 state, and after the M3 state progresses to the M2 state, the first checkpoint 154 is not activated.

In an embodiment, the scenario state manager 120 tracks the progress of the trainee from state to state and may transmit a message to the trainee via the messaging layer 112, the retail management system 102, and the UI 104 to indicate that the trainee has gotten off track and has not followed the prescribed path through the scenario. While it is contemplated that a variety of procedures may be followed to track the progress of a trainee through a scenario, in an embodiment the scenario state manager 120 maintains a plurality of counters to count how many states the trainee has progressed through and how many checkpoints the trainee has progressed through. For example, the states in the exemplary scenario 150 may be numbered linearly from 1 to 8 as (in the first sub-sequence 152) M1 (state 1), M2 (state 2), M3 (state 3), (in the second sub-sequence 156) M4 (state 4), M5 (state 5), (in the third sub-sequence 160) M6 (state 6), (in the fourth sub-sequence 164) M2 (state 7), and M7 (state 8). If a state counter stores the value '4' in memory the scenario state manager 120 would infer thereby that the trainee had progressed to the fourth state M4 and is in the second sub-sequence 156. In an embodiment, a checkpoint counter may likewise be stored in memory to keep track of what checkpoints the trainee has completed. It will be appreciated by one of ordinary skill in the art that the current state of the trainee's scenario or training session may be stored in any of a variety of formats. For example the counter may store a name of a state or a unique identifier of a state.

The state counters may be stored in a data structure such as a training session that may further comprise information that identifies the trainee, the scenario, and other administrative information such as a day the scenario was initiated, an identity of an instructor, and the like. The training session data structure may further keep track of corrective feedback that has been sent to the trainee, for example a message informing the trainee that he or she has not followed the canonical sequence of API method invocation and urging him or her to follow the prescribed sequence of API method invocations. In an embodiment, the trainee may halt the scenario, log off of the UI 104, and resume the scenario where he or she left off, for example after a lunch period or after a return to a training facility the next day.

An instructor or administrator may log into the instructor user interface 116 to monitor the progress of one or more trainees. The instructor user interface 116 may interact with the instructor monitor 122 to access the state and results of a selected trainee. The instructor user interface 116 may, for example, determine how rapidly the trainee is progressing through a scenario and how many instances of corrective feedback have been provided to the student. By examining the progress of each of the trainees in this way, the instructor may be able to determine if the trainees are generally learning the procedures being trained or whether they are confused and may need further lecture instruction to understand procedures or processes better. By examining the progress of each of the trainees in this way, the instructor may be better able to select an opportune time to call a halt for a lunch break. The instructor or other administrator may use the scenario builder 126 to define a scenario, for example the exemplary scenario 150. The instructor or administrator may use the class builder 124 to define a class as a sequence of scenarios. The scenarios and classes may be stored in the data store 110. The trainee sessions, also, may be stored in the data store 110.

With reference again to FIG. 2, the API training application 108 and/or the scenario state manager 120 determines when a trainee has activated or culminated in a checkpoint. When a checkpoint is activated or tolled, the scenario state manager 120 requests a feedback update from the backend simulator 106. The backend simulator 106 is able to provide appropriate feedback messages that simulate the feedback that would be provided in a production system. The feedback messages can be tailored and/or dynamically adapted based on the checkpoint activated and based on the trainee sessions. For example, a first trainee completing a given checkpoint may be provided a first stateful feedback while a second trainee completing the same checkpoint may be provided a second stateful feedback, where the second stateful feedback is different from the first stateful feedback.

This different feedback may be referred to as particularized updated information in some contexts herein. The different feedback can be viewed as particularized information because it may contain some information that is specific to the subject trainee's scenario, for example referencing a Mr Brown that the trainee entered as a fictional subscriber name when beginning the scenario. The different feedback can be viewed as updated information because the information has changed in response to the most recent API method invocations, for example the API method invocations associated with the states of the sub-scenario culminating in the subject checkpoint. The stateful feedback associated with activation of a checkpoint may be particularized or differentiated by including information that the trainee may have provided earlier in the scenario, for example a name of a fictional subscriber.

When the trainee wanders off the sequence of prescribed API method invocations defined by the scenario, the scenario state manager 120 and/or the API training application 108 may provide "bumpers" to steer the trainee back into the prescribed sequence of API method invocations. A message may be transmitted to the UI 104 informing the trainee to get back on path and to follow the prescribed sequence of API method invocations. In an embodiment, the message is propagated as an exception back to the retail management system 102, and the retail management system 102 presents textual content embedded in the exception to the appropriate UI 104. In some contexts, this may be referred to as a harmless exception, as this exception does not invoke an error handling routine and does not cause termination of the executing retail management system 102 or of the executing UI 104.

Figure 4:
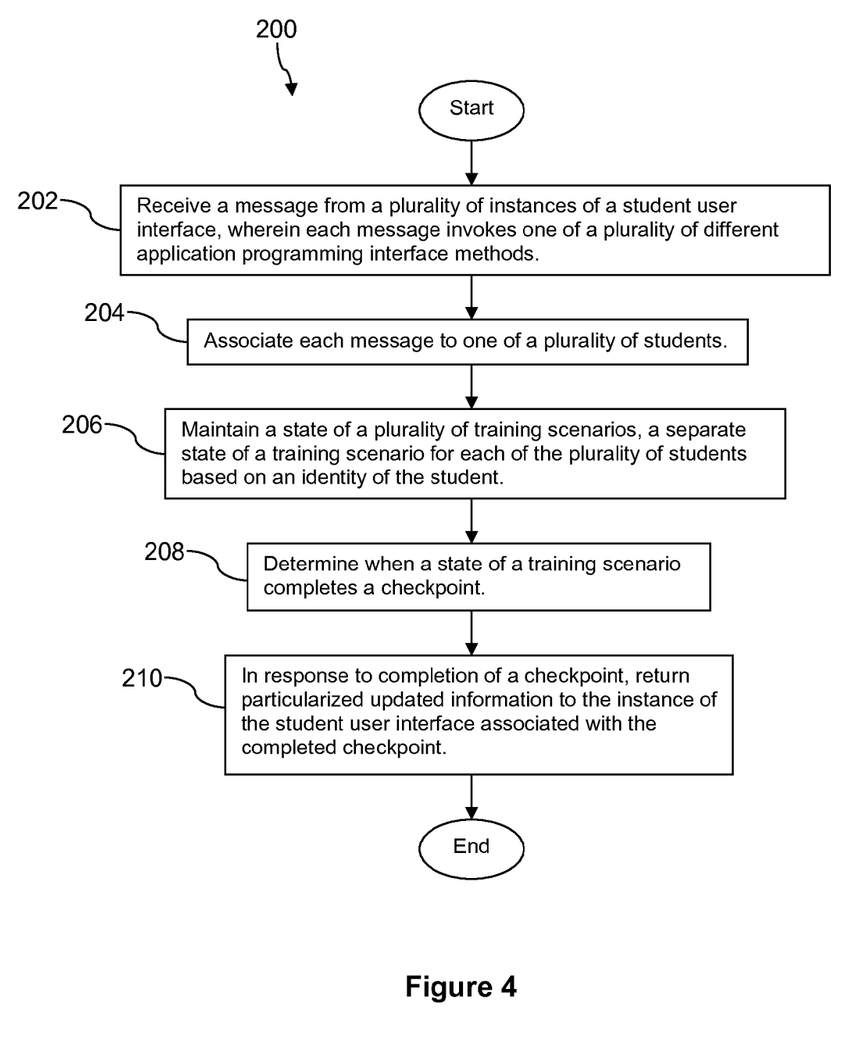
FIG. 4 is a flow chart of a method according to an embodiment of the disclosure.

Turning now to FIG. 4, a method 200 is described. At block 202, receive a message from a plurality of instances of a student user interface, wherein each message invokes one of a plurality of different application programming interface methods. In an embodiment, the student user interfaces may be provided by a production provisioning tool. At block 204, associate each message to one of a plurality of students. At block 206, maintain a state of a plurality of training scenarios, a separate state of a training scenario for each of the plurality of students based on an identity of the student. At block 208, determine when a state of a training scenario completes a checkpoint. At block 210, in response to completion of a checkpoint, return particularized updated information to the instance of the student user interface associated with the completed checkpoint. The method 200 may be performed by and/or using the system 100 described above to instruct trainees in the use of a customer-facing application that is used by staff in a mobile phone store. The method 200 may be used to instruct the trainees to activate new mobile phones, to add a line to a wireless communication subscription account, to delete a line from a wireless communication subscription account, to enable and/or activate special services delivered via a wireless communication subscription account, to enable and/or activate non-standard class of service operation for a wireless communication subscription account, and other actions.

Figure 5A:
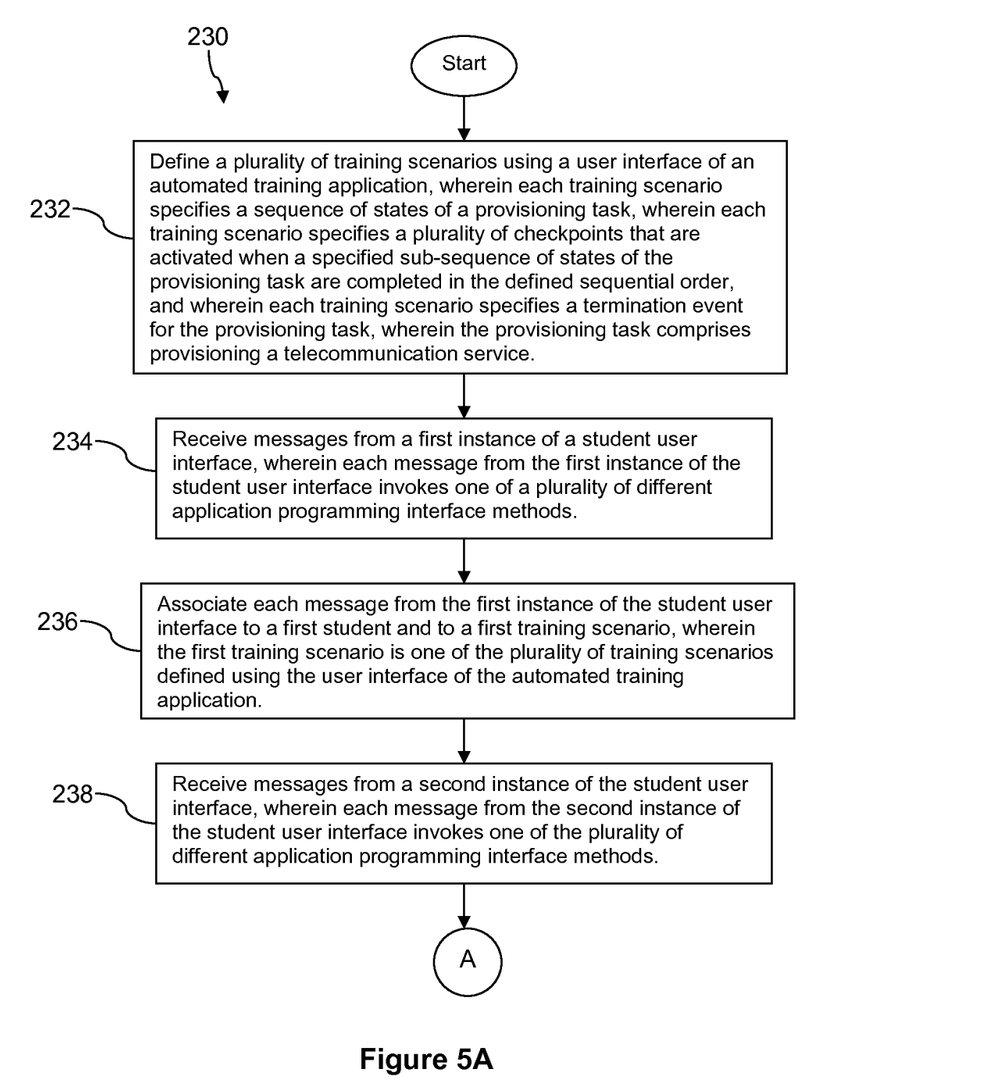
FIG. 5A and FIG. 5B are a flow chart of a method according to an embodiment of the disclosure.
Figure 5B:
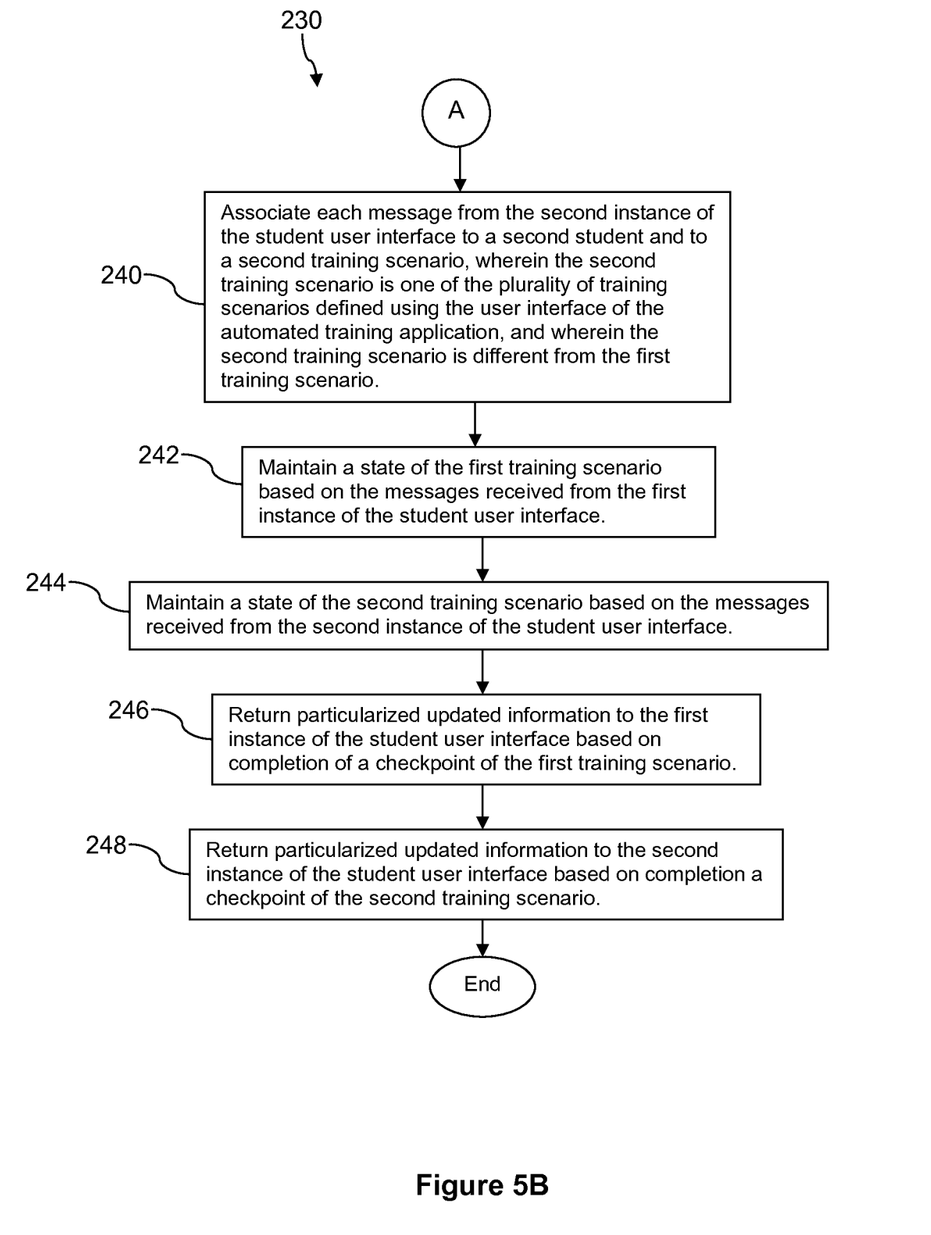

Turning now to FIG. 5A and FIG. 5B, a method 230 is described. At block 232, define a plurality of training scenarios using a user interface of an automated training application, wherein each training scenario specifies a sequence of states of a provisioning task, wherein each training scenario specifies a plurality of checkpoints that are activated when a specified sub-sequence of states of the provisioning task are completed in the defined sequential order, and wherein each training scenario specifies a termination event for the provisioning task, wherein the provisioning task comprises provisioning a telecommunication service. At block 234, receive messages from a first instance of a student user interface, wherein each message from the first instance of the student user interface invokes one of a plurality of different application programming interface methods.

At block 236, associate each message from the first instance of the student user interface to a first student and to a first training scenario, wherein the first training scenario is one of the plurality of training scenarios defined using the user interface of the automated training application. At block 238, receive messages from a second instance of the student user interface, wherein each message from the second instance of the student user interface invokes one of the plurality of different application programming interface methods. At block 240, Associate each message from the second instance of the student user interface to a second student and to a second training scenario, wherein the second training scenario is one of the plurality of training scenarios defined using the user interface of the automated training application, and wherein the second training scenario is different from the first training scenario.

At block 242, maintain a state of the first training scenario based on the messages received from the first instance of the student user interface. At block 244, maintain a state of the second training scenario based on the messages received from the second instance of the student user interface. At block 246, return particularized updated information to the first instance of the student user interface based on completion of a checkpoint of the first training scenario. At block 248, return particularized updated information to the second instance of the student user interface based on completion a checkpoint of the second training scenario.

Figure 6:
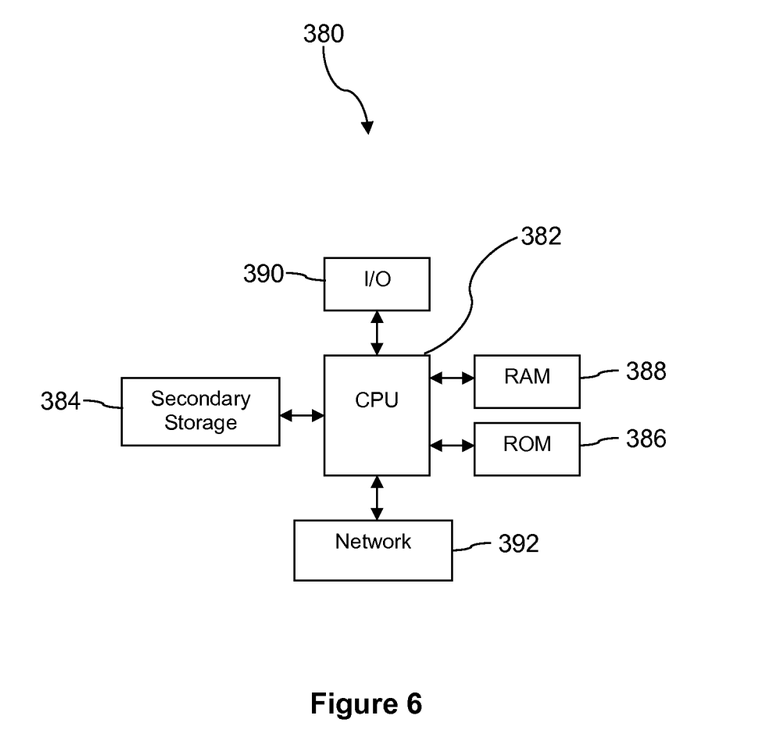
FIG. 6 is an illustration of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of setting states for training scenarios for use during the training of students in use of a telecommunication service provider customer-facing application, comprising:

receiving, by an application from a messaging layer in communication with a network, a first plurality of messages from a first instance of use of a student user interface, wherein the messaging layer provides a communication link between the student user interface in communication with the network and a retail management system in communication with the network, and wherein each message of the first plurality of messages from the first instance of use of the student user interface invokes an application programming interface method of a plurality of different application programming interface methods;

associating, by the application, each message from the first instance of the student user interface to a first student and to a first training scenario of a plurality of training scenarios, wherein each training scenario of the plurality of training scenarios is defined by a predefined sequence of application programming interface method calls of a provisioning task, a plurality of checkpoints that are activated when a specified sub-sequence of application programming interface method calls associated with the provisioning task are completed in the predefined sequence, and a termination event for the provisioning task, wherein the provisioning task comprises provisioning a telecommunication service, and wherein each checkpoint of the plurality of checkpoints is defined by a predefined plurality of application programming interface method calls that are completed in the predefined sequence;

receiving, by the application, a second plurality of messages from a second instance of use of the student user interface, wherein each message of the second plurality of messages invokes one of the plurality of different application programming interface methods;

associating, by the application, each message from the second instance of use of the student user interface to a second student and to a second training scenario of the plurality of training scenarios, and wherein the second training scenario is different from the first training scenario;

maintaining, by the application, based on the first plurality of messages, a state of the first training scenario, wherein maintaining the state of the first training scenario comprises maintaining a first list of invocations of application programming interface methods and maintaining a first list of checkpoints that have been completed by the first student;

maintaining, by the application, based on the second plurality of messages, a state of the second training scenario, wherein maintaining the state of the second training scenario comprises maintaining a second list of invocations of application programming interface methods and maintaining a second list of checkpoints that have been completed by the second student;

returning, by the application, based on completion of a checkpoint of the first training scenario, particularized updated information to the first instance of use of the student user interface; and returning, by the application, based on completion of a checkpoint of the second training scenario, particularized updated information to the second instance of use of the student user interface.

2. The method of claim 1, wherein the particularized updated information sent to the first instance of use of the student user interface is based at least in part on an identity of the first student and the particularized updated information sent to the second instance of use of the student user interface is based at least in part on an identity of the second student.

3. A stateful application programming interface training system, comprising:

a student user interface comprising a retail management system (RMS) configured for use in a telecommunication service provider customer facing production environment, wherein an instance of use of a plurality of instances of use of the student user interface is launched for each student using the training system; and a computer system comprising a non-transitory memory, a processor, and an application programming interface training application, wherein the application programming interface application is executable by the processor to:

receive a plurality of messages from the instance of use of the student user interface, wherein each message of the plurality of messages comprises an application programming interface method call of a plurality of different application programming interface method calls, pass each message of the plurality of messages to the RMS;

associate each message to a student of a plurality of students, maintain a state for each training scenario of a plurality of training scenarios, wherein each training scenario is associated with a student of the plurality of students based on an identity of the student, wherein maintaining the state of each training scenario comprises maintaining a list of a plurality of invocations of application programming interface methods and maintaining a list of a plurality of checkpoints that have been completed by the student, wherein each checkpoint of the plurality of checkpoints is defined by a predefined plurality of application programming interface method calls that are completed in a predefined sequence, determine, in response to completion of a checkpoint associated with a training scenario, a state of the training scenario, and return, in response to completion of the checkpoint, particularized updated information to the instance of use of the student user interface associated with the completed checkpoint.

4. The system of claim 3, wherein the application programming interface training application further is configured to implement a training scenario builder that provides controls for defining each of the plurality of training scenarios.

5. The system of claim 4, wherein each of the plurality of training scenarios comprises a definition of a preferred sequence of invocations for each application programming interface method of the plurality of application programming interface methods.

6. The system of claim 5, wherein the state of the training scenario of the plurality of training scenarios is based on the progress of the student through the preferred sequence of invocations of different application programming instance methods.

7. The system of claim 5, wherein each training scenario of the plurality of training scenarios comprises a definition of at least one checkpoint, wherein a checkpoint is completed when a sub-sequence of the preferred sequence of invocations of different application programming interface methods of the training scenario is completed.

8. The system of claim 3, wherein the particularized updated information associated with completing the checkpoint is different from the particularized updated information associated with completing a previous checkpoint.

9. The system of claim 8, wherein the particularized updated information associated with completing the checkpoint by the student is different from the particularized updated information associated with completing the same checkpoint by a different student.

10. A method of setting states for training scenarios for use during the training of students in use of a telecommunication service provider customer-facing application, comprising:

receiving, by an application stored in a non-transitory memory of a computer system and executable by a processor stored in the non-transitory memory, a plurality of messages from a plurality of instances of use of a student user interface, wherein each message invokes one of a plurality of different application programming interface methods;

sending, by the application, each message of the plurality of messages to a retail management system, wherein each message causes the execution of a corresponding application programming interface method in the retail management system;

associating, by the application, each message of the plurality of messages to a student of a plurality of students;

maintaining, by the application, based on an identity of the student, a state of a training scenario of a plurality of training scenarios, wherein a separate state is maintained for each training scenario of the plurality of training scenarios for each student of the plurality of students based on the identity of the student, wherein maintaining the state of each training scenario comprises maintaining a list of invocations of application programming interface methods and maintaining a list of checkpoints that have been completed by the student, wherein each checkpoint is defined by a predefined plurality of application programming interface method calls that are completed in a predefined sequence;

determining, by the application, when a checkpoint is completed;

updating the state of the training scenario; and in response to completion of the checkpoint, returning particularized updated information to the instance of use of the student user interface associated with the completed checkpoint.

11. The method of claim 10, wherein the customer-facing application is used by staff in a mobile phone store to one of activate new mobile phones, add a line to a wireless communication subscription account, and delete a line from a wireless communication subscription account.

12. The method of claim 10, wherein a first training scenario of the plurality of training scenarios maintained for a first student is different from a second training scenario of the plurality of training scenarios maintained for a second student, and wherein the first and second training scenarios are maintained concurrently.

13. The method of claim 10, wherein each of the training scenarios differ from the other training scenarios by at least one of defining a different sequence of invocations of application programming interface methods, defining an invocation of an application programming interface method not defined in another training scenario, or defining a different checkpoint.

14. The method of claim 10, wherein the instances of use of the student user interface is provided by a production provisioning tool.

15. The method of claim 14, wherein the production provisioning tool is a retail management system (RMS) and wherein the student user interfaces are instances of use of a user interface to the retail management system.

16. The method of claim 15, further comprising providing, in response to an application programming interface method being invoked out of a sequence defined by a training scenario of the plurality of training scenarios, a notification to a student user.

17. The method of claim 16, wherein the notification is provided by an exception that is propagated to the retail management system.

18. The method of claim 10, further comprising providing an interface to an instructor that provides controls for viewing the state of the training scenarios of each of the students.

19. The system of claim 5, wherein the state is updated in response to completion of a second checkpoint of the training scenario.

* * * * *